US012692083B2

(12) United States Patent
Fourney et al.

(10) Patent No.: US 12,692,083 B2
(45) Date of Patent: Jul. 28, 2026

(54) ZONE-ACTUATED INLINE DUAL-STACKED ROLLER BELT CONVEYOR

(71) Applicant: Laitram, L.L.C., Harahan, LA (US)

(72) Inventors: Matthew L. Fourney, Laurel, MD (US); Joseph F. Kovacs, New Orleans, LA (US); Angela Longo Marshall, Harahan, LA (US); John E. Wenzel, Madisonville, LA (US); Christopher B. Spicer, Silver Spring, MD (US); James L. Brun, Forest Hill, MD (US); Gilbert J. MacLachlan, Harahan, LA (US); Richard M. Klein, Slidell, LA (US); David W. Bogle, Franklinton, LA (US)

(73) Assignee: Laitram, L.L.C., Harahan, LA (US)

( * ) Notice: Subject to any disclaimer, the term of this patent is extended or adjusted under 35 U.S.C. 154(b) by 91 days.

(21) Appl. No.: 18/730,062

(22) PCT Filed: Jan. 9, 2023

(86) PCT No.: PCT/US2023/010416
§ 371 (c)(1),
(2) Date: Jul. 18, 2024

(87) PCT Pub. No.: WO2023/158527
PCT Pub. Date: Aug. 24, 2023

(65) Prior Publication Data
US 2025/0115436 A1 Apr. 10, 2025

Related U.S. Application Data

(60) Provisional application No. 63/312,217, filed on Feb. 21, 2022.

(51) Int. Cl.
*B65G 17/24* (2006.01)

(52) U.S. Cl.
CPC .......... *B65G 17/24* (2013.01); *B65G 2207/48* (2013.01)

(58) Field of Classification Search
CPC ............................ B65G 17/24; B65G 2207/48
USPC ........................................................ 198/779
See application file for complete search history.

(56) References Cited

U.S. PATENT DOCUMENTS

| | | | | |
|---|---|---|---|---|
| 4,293,064 A * | 10/1981 | Robinson | ............... | B65G 17/24 198/779 |
| 7,360,641 B1 | 4/2008 | Fourney | | |
| 7,757,838 B2 * | 7/2010 | Fandella | ............... | B65G 17/40 198/779 |

(Continued)

FOREIGN PATENT DOCUMENTS

| | | |
|---|---|---|
| DE | 4321314 A1 | 1/1995 |
| JP | 57-46513 U | 3/1982 |

(Continued)

*Primary Examiner* — Mark A Deuble
(74) *Attorney, Agent, or Firm* — James T. Cronvich

(57) ABSTRACT

A belt conveyor comprising a conveyor belt having upper and lower inline rollers arranged in a stack and selectively actuated to rotate. When actuated, the upper article-supporting rollers are rotated by contact with the lower rollers riding on raised bearing faces in a carryway. When deactuated, the upper rollers are braked by braking pads and the lower rollers are out of contact with lowered bearing faces. The belt rollers are actuated and deactuated by a matrix of individually controllable roller actuation assemblies, each defining a roller actuation zone.

33 Claims, 8 Drawing Sheets

(56) References Cited

U.S. PATENT DOCUMENTS

| | | | | |
|---|---|---|---|---|
| 8,424,675 B2 * | 4/2013 | Rau | ........................ | B65G 17/24 198/779 |
| 8,678,179 B2 * | 3/2014 | Kaes | ..................... | B65G 15/48 198/779 |
| 8,678,180 B2 * | 3/2014 | Marshall | ................ | B65G 17/24 198/779 |
| 9,010,523 B2 | 4/2015 | Fourney | | |
| 9,079,717 B1 * | 7/2015 | Costanzo | ............. | B65G 39/025 |
| 9,352,908 B1 | 5/2016 | Fourney | | |
| 10,442,626 B2 * | 10/2019 | Marshall | ................ | B65G 17/08 |
| 2006/0249354 A1 | 11/2006 | Riddick et al. | | |
| 2011/0056807 A1 * | 3/2011 | Fourney | ................ | B65G 17/24 198/779 |
| 2014/0090961 A1 | 4/2014 | Costanzo et al. | | |
| 2015/0191311 A1 * | 7/2015 | Costanzo | .............. | B65G 47/34 198/779 |
| 2022/0315344 A1 | 10/2022 | Marshall | | |
| 2024/0199339 A1 * | 6/2024 | Baker | ................... | B65G 17/24 |

FOREIGN PATENT DOCUMENTS

| | | | |
|---|---|---|---|
| JP | 58-191115 | U | 12/1983 |
| JP | 60-252509 | A | 12/1985 |
| JP | H2-7218 | | 1/1990 |
| JP | 05-081116 | U | 11/1993 |
| JP | 2015-020842 | A | 2/2015 |

* cited by examiner

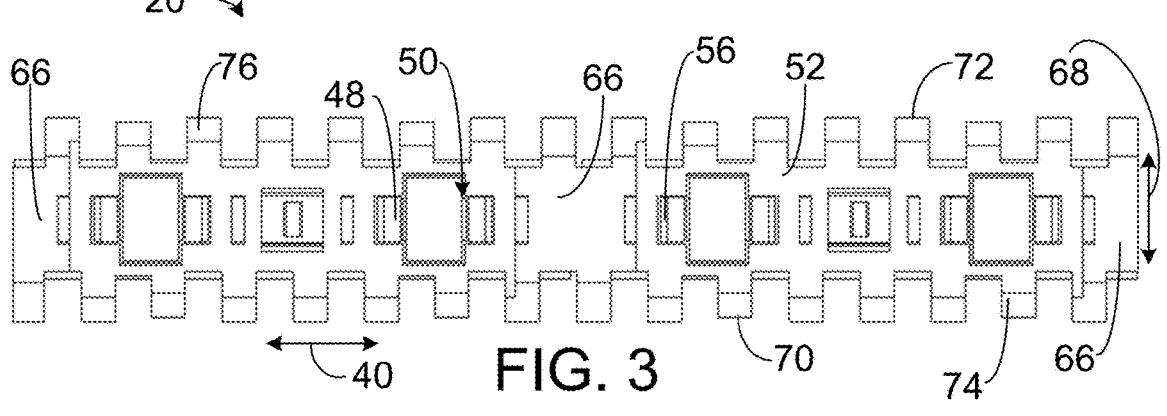
FIG. 1
FIG. 2
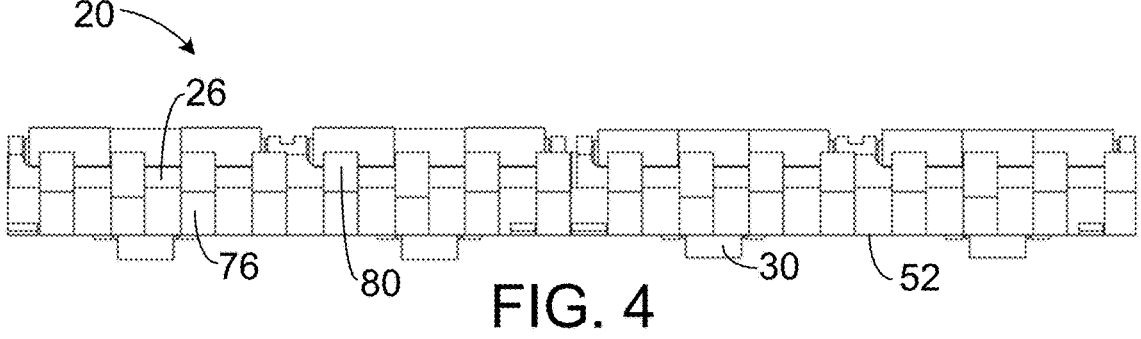
FIG. 3
FIG. 4

ZONE-ACTUATED INLINE DUAL-STACKED ROLLER BELT CONVEYOR

BACKGROUND

The invention relates generally to power-driven conveyors and, more particularly, to belt conveyors with actuatable stacked rollers.

Many conveying applications require that articles be spaced apart in the conveying direction. Throughput can be increased if the gaps between consecutive conveyed articles can be made small. It's also often important that articles traveling side by side be separated in the conveying direction so that they can be merged downstream without colliding. And in some applications, accumulating articles with low backline pressure until downstream processing is available is important. Registration belts with actuated inline rollers and pop-up flights, such as described in U.S. Pat. No. 7,311,192, are used to space articles on set spacings. But those registration belts are limited to article-spacing intervals fixed by the positions of the flights. They can't dynamically adjust the gaps between consecutive articles, and they can't separate side-by-side articles. Furthermore, because articles on registration belts are pushed forward against the flights by the actuated rollers and move with the belts, the dwell times of the articles on the belts depend on the lengths of the belts and their speeds.

SUMMARY

One version of a conveyor belt embodying features of the invention comprises a plurality of cradles, each supporting at least one roller set. Each roller set includes a lower roller having a salient portion that protrudes below a bottom side of the belt and a pair of upper rollers that form a support surface for conveyed articles. The lower roller and the upper rollers are rotatable on axes perpendicular to a direction of belt travel. Rotation of the lower roller in one direction causes the upper rollers to rotate in the opposite direction when the lower roller is in contact with the upper rollers. Each of the cradles is translatable from a first position in which the upper rollers are at a first height level to a second position in which the upper rollers are at a higher second height level and in contact with the upper rollers.

One version of a conveyor belt module embodying features of the invention comprises a base and a roller assembly slidably attached to the base. The base extends in a length direction from a first end to a second end and laterally in a width direction from a first side to a second side. The base includes a bottom side and an upper deck, a first set of hinge elements spaced apart along the first end and a second set of hinge elements spaced apart along the second end, a cavity opening onto the bottom side and the upper deck, and bosses on the upper deck. The roller assembly includes a cradle having at least one pair of side-by-side roller beds and end supports at opposite ends of the roller beds, upper rollers in the roller beds, a lower roller disposed in the cavity and having a salient portion extending below the bottom side and having a lower-roller axle and. Upper-roller axles are supported by the end supports and extend laterally through the upper rollers and define a lateral axis of rotation for the upper rollers. The cradle further includes openings in the roller beds for the bosses. Raising the lower roller pushes against the upper rollers to raise the cradle away from the upper deck so that the bosses do not extend through the openings into the roller beds and so that rotation of the lower roller in one direction causes the upper rollers to rotate in the opposite direction. And lowering the lower roller allows the cradle to rest against the upper deck with the bosses extending through the openings into the roller beds and against the upper rollers to brake the upper rollers from rotating.

One version of a roller actuation assembly embodying features of the invention comprises an actuator base and a bearing unit slidably attached to the actuator base. The bearing unit includes a pair of bearing blocks that have top bearing faces extending in length in a first direction from a first end to a second end, an intermediate portion connected to the pair of bearing blocks and having a top face below the level of the top bearing faces, and a wearstrip support stationarily affixed to the actuator base above the top face of the intermediate portion of the bearing unit. An actuator mounted in the actuator base and coupled to the bearing unit moves the bearing unit between a lowered position and a raised position.

One version of a conveyor embodying features of the invention comprises a conveyor belt and a plurality of roller actuation assemblies disposed below the conveyor belt. The conveyor belt includes a bottom side and multiple roller assemblies arranged in lanes extending in a direction of belt travel. Each of the roller assemblies includes a lower roller having a salient portion that protrudes below the bottom side and a pair of upper rollers forming a support surface for conveyed articles. The lower roller and the upper rollers are rotatable on axes perpendicular to a direction of belt travel. Rotation of the lower roller in one direction causes the upper rollers to rotate in the opposite direction when the lower roller is in contact with the upper rollers. The conveyor belt also includes a cradle supporting the pair of upper rollers. The cradle and the lower roller are vertically translatable. Roller actuation assemblies are disposed below the conveyor belt. Each of the roller actuation assemblies is associated with one or more of the lanes of roller assemblies and include one or more bearing faces extending in length in the direction of belt travel under the lower rollers in one or more of the lanes of roller assemblies, a wearstrip support positioned below the bottom side of the conveyor between the lower rollers of consecutive lanes, and an actuator that moves the one or more bearing faces from a lowered position out of contact with the lower rollers in the associated lanes to a raised position providing surfaces on which the lower rollers in the associated lanes can rotate in one direction as the conveyor belt advances in the direction of belt travel to cause the upper rollers to rotate in the opposite direction. Wearstrips supported on the wearstrip supports contact the bottom side of the conveyor belt between the lower rollers of consecutive lanes.

Another version of a conveyor belt comprises a bottom side, a plurality of cavities opening onto the bottom side, and a plurality of cradles. A lower roller is mounted in each of the cavities with a salient portion protruding below the bottom side. The lower roller is translatable along the cavity. Each of the cradles supports two or more roller sets. Each roller set includes a pair of upper rollers forming a support surface for conveyed articles. The lower rollers and the upper rollers are rotatable on laterally extending axes perpendicular to a direction of belt travel. The two or more roller sets are laterally spaced across the width of the conveyor belt. Each of the roller sets is associated with one of the lower rollers. Rotation of the lower rollers in one direction causes the upper rollers in the associated roller sets to rotate in the opposite direction when the lower rollers are in contact with the upper rollers. Each of the cradles is translatable from a first position in which the upper rollers are at a first height level to a second position in which the upper rollers are at a higher second height level and in contact with the lower rollers.

And another version of a conveyor belt comprises a bottom side, a plurality of cavities opening onto the bottom side, and a plurality of cradles. Each of the cradles supports one or more roller sets that each include one or more upper rollers forming a support surface for conveyed articles and a lower roller with a salient portion protruding below the bottom side from one of the cavities. The lower roller is translatable along the cavity. The lower roller is mounted on a lower-roller axle for rotation. Ends of the lower-roller axle are received in the cradle free to translate relative to the cradle. The lower rollers and the one or more upper rollers are rotatable on laterally extending axes perpendicular to a direction of belt travel. Rotation of the lower rollers in one direction causes the upper rollers to rotate in the opposite direction when the lower rollers are in contact with the upper rollers. Each of the cradles is translatable from a first position in which the upper rollers are at a first height level to a second position in which the upper rollers are at a higher second height level and in contact with the lower rollers.

BRIEF DESCRIPTION OF THE DRAWINGS

FIG. 1 is a perspective view of a conveyor belt module embodying features of the invention.

FIG. 2 is an exploded view of the conveyor belt module of FIG. 1.

FIG. 3 is a bottom plan view of the conveyor belt module of FIG. 1.

FIG. 4 is a front elevation view of the conveyor belt module of FIG. 1.

DETAILED DESCRIPTION

Figure 5:
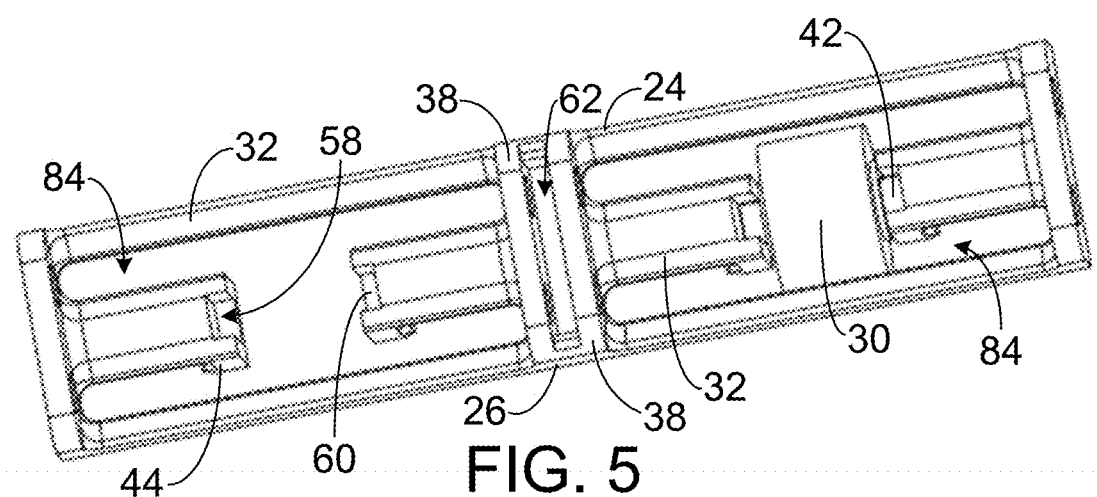
FIG. 5 is a perspective view of a roller cradle of the conveyor belt module as in FIG. 1 with the upper rollers and one of the lower rollers removed.

A conveyor belt module embodying features of the invention is shown in FIGS. 1-4. The module 20 comprises a base 22 to which one or more, in this case two, roller assemblies 24 are mounted. The roller assemblies 24 snap in place and have a limited range of vertical translation. Each roller assembly 24 has a cradle 26 supporting two roller sets 64 each including a pair of side-by-side upper rollers 28 and a lower roller 30 arranged in a vertical stack. But cradles with one roller set or more than two roller sets would be possible. And cradles with roller sets having a single upper roller in or slightly off vertical alignment with a lower roller are also possible. In this version the base 22 and the cradle 26 are made of a thermoplastic material, but in other versions could be made of metal or other materials. The upper rollers 28 reside in parallel in roller beds 32 in the cradle 26. Upper-roller axles 34 extend through bores 36 in the upper rollers 28. The upper-roller axles 34 are supported by end supports 38 at the axial ends of each roller bed 32. The axles 34 define lateral axes of rotation of the upper rollers 28 parallel to the width direction 40 of the module 20 so that the rollers rotate in the length direction 68. The lower roller 30 of each stacked roller set 64 is suspended on a lower-roller axle 42 below the upper-roller beds 32 between a pair of legs 44 that extend downward from the bottom of the cradle 26. The distal ends 46 of the legs 44 terminate in tabs 48. The axial length of the lower roller 30 is less than the axial length of the upper rollers 28, and the diameter of the lower roller is greater than that of the upper rollers in this version. But other versions in which the diameter of the upper rollers is at least as great as the diameter of the lower rollers are possible with other belt geometries.

The cradle 26 is snapped onto the base 22 by inserting the legs 44 through cavities 50 that open onto a bottom side 52 and an upper deck 54 of the base 22. The distal ends 46 of the opposing legs 44 bend toward each other as the cradle 26 is being installed until they snap into place with the tabs 48 retained by retention structure in the form of stops 56 protruding laterally from laterally facing sides of the cavity 50. The tabs 48 at the ends of the legs 44 and the stops 56 constitute retention structure retaining the cradle 26 to the base 22. The stops 56 are positioned between the bottom side 52 and the upper deck 54. Channels are formed on laterally opposite sides of the cavities 50 between the stops 56 and the bottom side 52 of the base. The legs 44 are long enough to provide the tabs 48 a range of motion in the channels that extends downward from the stops 56 to the bottom side 52 of the base 22.

Once the cradle 26 is snapped into place in the base 22, the lower rollers 30 and their axles 42 are lowered into the cavities 50. The ends of the lower-roller axles 42 move down slots 58 in facing faces of the legs 44 as also shown in FIG. 5. The slots 58 are open at the top to admit the lower-roller axles 42. The slots 58 terminate in slot seats 60 at the distal ends 46 of the legs 44. The lower-roller axles 42 in the slots 58 keep the legs 44 spread to ensure retention of the cradle 26 to the base 22. The lower-roller axles 42 are vertically movable along the slots 58 upward from the slot seats 60. Like the upper-roller axles 34, the lower-roller axles 42 define lateral axes of rotation parallel to the axes of rotation of the upper rollers 28 and to the width direction 40. Also like the upper rollers 28, the lower roller 30 is an inline roller that rotates parallel to the module's length direction 68. Alternatively, the slots for the lower-roller axle could be formed in the base instead of in channels in the legs of the cradle. The legs would extend through dedicated openings in the base spaced laterally apart from the lower-roller cavities. This version of retention structure is separated from the roller cavities by intervening base structure.

After the lower rollers 30 are installed, the upper rollers 28 are seated on their roller beds 32. Then the upper-roller axles 34 are inserted through the roller bores 36 and the end supports 38 to retain the upper rollers 28 in place in the cradle 24. Unlike the lower roller 30, which can translate relative to the cradle 24, or float, along the slots 58, the upper rollers 28 cannot; they are essentially fixed in position in the cradle by the axles 34 retained in the end supports 38. The freedom of the upper rollers 28 to translate only slightly relative to the cradle 24 is due to the small differences in the diameters of the upper-roller axles 34 and bores 36. Bumps 61 in the middle of the upper roller axles 34 reside in gaps 62 between the end supports 38 of the laterally adjacent upper and lower roller sets 64 to prevent the axles from wandering out of position. Other axle-retention features, such as knurls or thermal deformations of the axle, could be used instead of the bumps 61.

As shown in FIGS. 1 and 3, the conveyor belt module 20 has scalloped portions 66 formed in the bottom side 52 laterally spaced from the lower-roller cavities 50. The conveyor belt modules 20 extend in the length direction 68 from a first end 70 to a second end 72. First and second sets 74, 76 of hinge elements are spaced apart laterally along the first and second ends 70, 72 of the base 22. Laterally aligned rod holes 78 are formed in the hinge elements 74, 76 at each end 70, 72 of the modules 20. Wall segments 80 extend upward from the hinge elements 74, 76 to form segmented walls along each end 70, 72 that confine the roller assemblies 24 in the length direction 68 with respect to the base 22. Raised pads 82 on the upper deck 54 provide braking surfaces to brake the upper rollers 28 when the cradle 26 is lowered. As shown in FIG. 4, salient portions of the lower rollers 30 extend below the bottom side 52 of the conveyor belt module 20.

Figure 6:
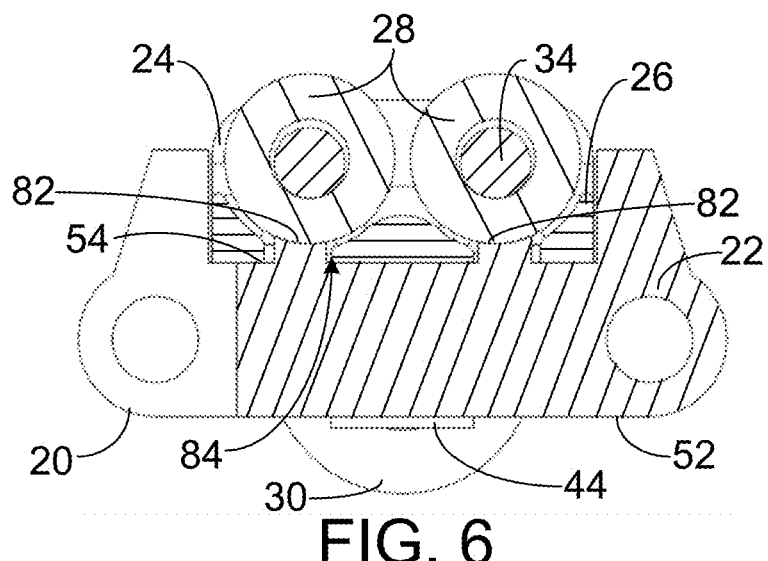
FIG. 6 is a cross section taken along lines VI-VI of FIG. 1.

FIG. 6 shows the roller assembly 24 in a lowered position with the upper rollers 28 at a lowered height level. In the lowered position of the roller assembly 24, the upper rollers 28 sit on the braking pads 82, which extend through openings 84 in the cradle 26 as also shown in FIG. 5. The weight of a conveyed article, such as a package, parcel, box, tray, or bag, atop the upper rollers 28 forces the upper rollers in the cradle 26 downward against the braking pads 82. Even without a conveyed article atop the upper rollers 28, their weight alone exerts a slight braking contact with the braking pads 82. Contact between the pads 82 and the upper rollers 28 prevents the rollers from rotating. The lower roller 30, lacking contact from below, is at its lowermost position with the ends of its axle 42 resting by gravity on the seats 60 of the slots 58. The cradle 26 rests on the upper deck 54. An article sitting atop the braked upper rollers 28 advances with the module 20. As the upper rollers 28 wear, their diameters decrease and start to lose contact with the braking pads 82 in the lowered position of the roller assembly 24. Such a loss of contact indicates that the upper rollers 28 should be replaced.

Figure 7:
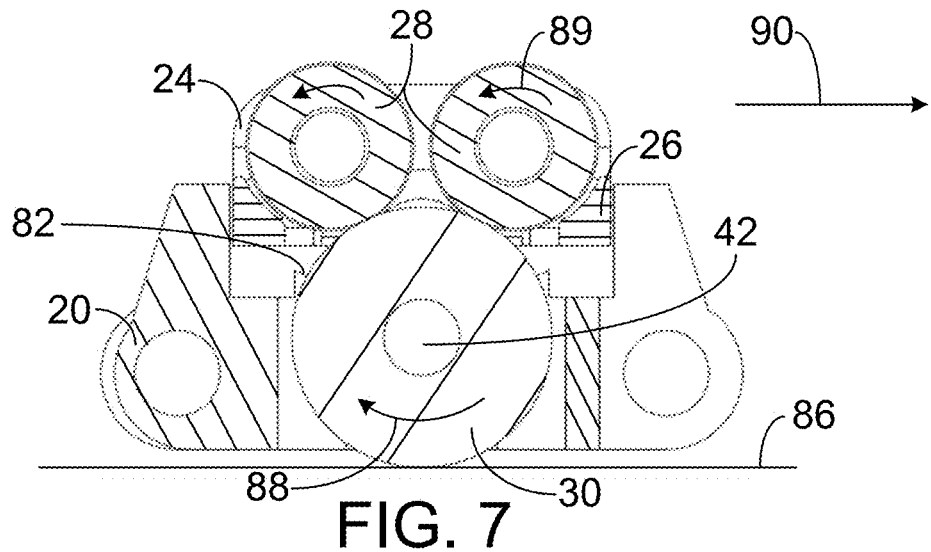
FIG. 7 is a cross section taken along lines VII-VII of FIG. 1, but with the rollers in a raised position.

FIG. 7 shows the roller assembly 24 in a raised position at a height level higher than in the lowered position by virtue of the lower roller's contact with a raised bearing surface 86. The lower roller 30 is pushed upward, the ends of its axle 42 moving up the slots 58 (FIG. 5). As the lower roller 30 moves upward relative to the cradle 20 along the slots 58, it pushes against the upper rollers 28, which rise upward along with the cradle 20. The braking pads 82, which are below the raised cradle 26, do not contact the upper rollers 28. With the roller assembly 24 in the raised position, rotation of the lower roller 30 in a first direction 88 as it rolls along the bearing surface 86 with the module 20 driven in the travel direction 90 causes the upper rollers 28 to rotate in the opposite direction 89. An article atop the upper rollers 28 is pushed opposite the direction of travel 90 and off the module 20. For effective engagement of the lower roller 30 with the upper rollers 28, the rollers' outer surfaces are made of a high-friction material, such as rubber or an elastomer. Alternatively, the outer surface of the lower roller and the portion of the upper rollers engaged by the lower roller could be geared surfaces for positive engagement without slip.

Figure 8:
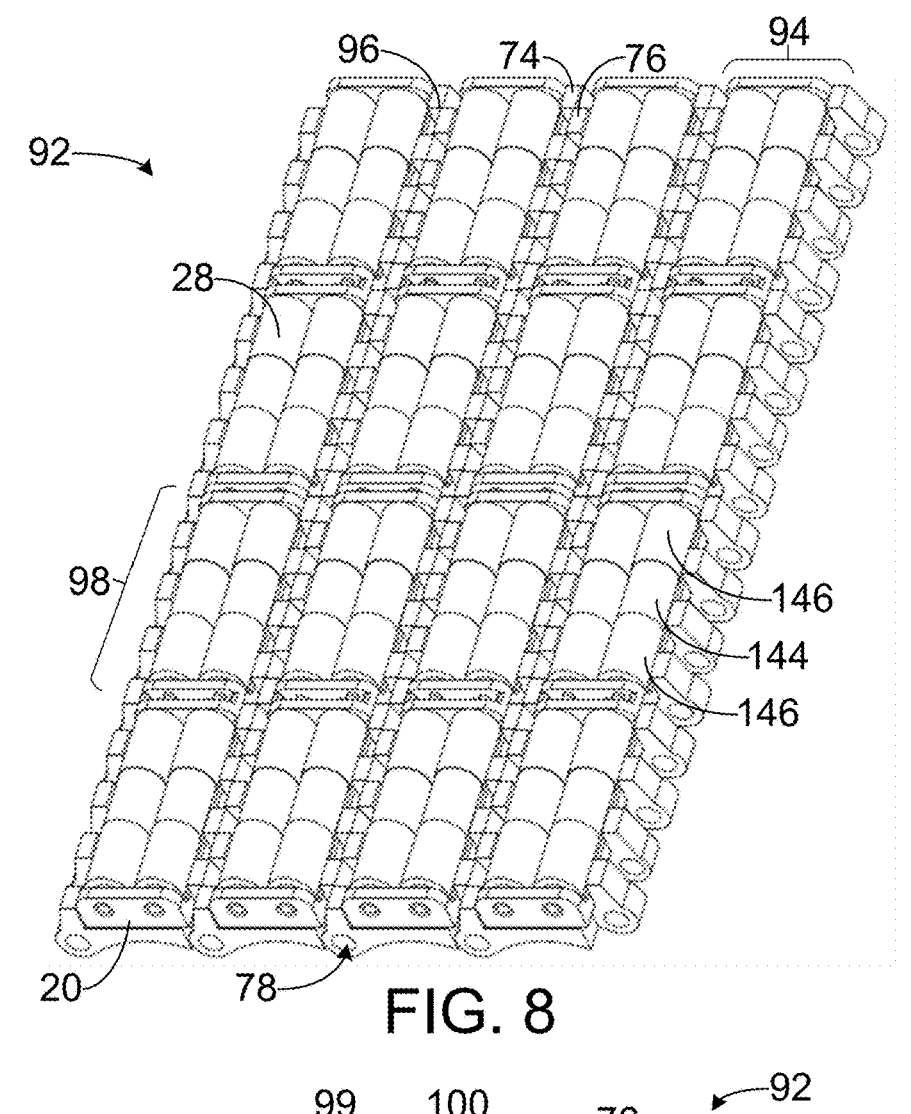
FIG. 8 is a perspective view of a portion of a conveyor belt constructed of modules as in FIG. 1.
Figure 9:
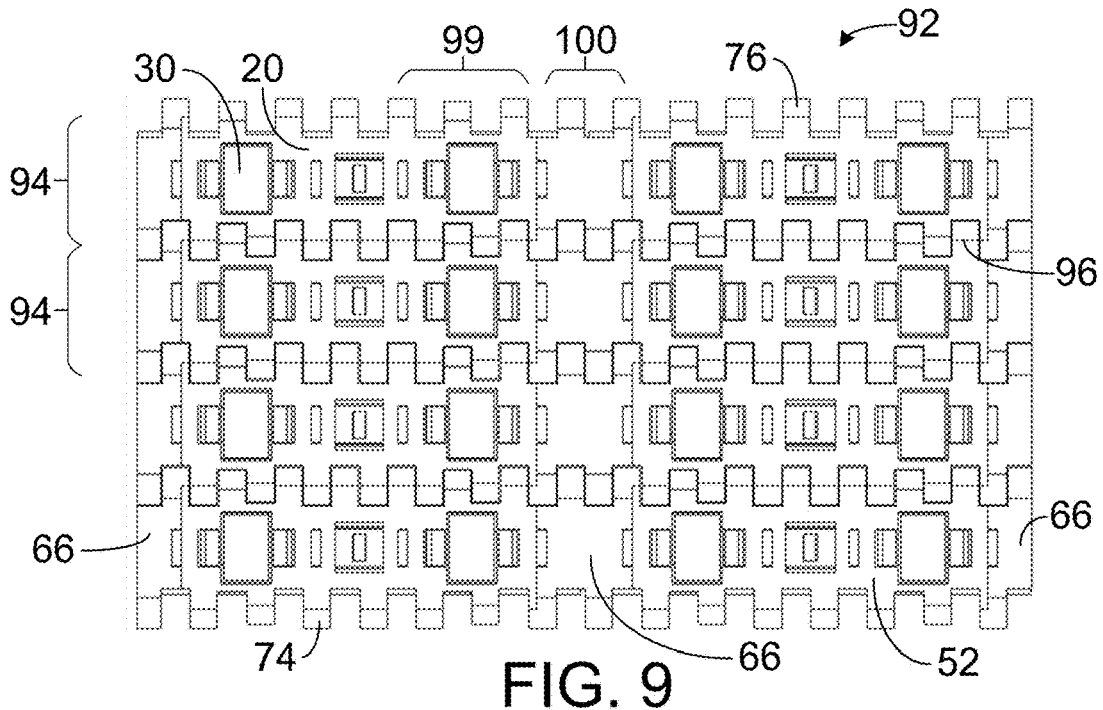
FIG. 9 is a bottom plan view of the conveyor-belt portion of FIG. 8.

FIGS. 8 and 9 show a portion of a conveyor belt 92 constructed of conveyor belt modules 20 as in FIG. 1. The belt 92 includes a series of rows 94 of the belt modules 20 arranged end to end with the first set of hinge elements 74 of a row 94 interleaved with the second set of hinge elements 76 of an adjacent row at a hinge joint 96. The aligned holes 78 of the interleaved hinge elements 74, 76 form a lateral passageway for a hinge rod (not shown) that joins the rows 94 together and forms the hinge joint 96 at which the belt 92 can articulate. As FIG. 8 shows, the upper rollers are arranged in lanes 98 spaced apart across the width of the conveyor belt 92. As shown in FIG. 9, the lower rollers 30 are also arranged in lanes 99 spaced apart across the width of the conveyor belt 92 on its bottom side 52. The scalloped portions 66 of the bottom side 52 are also arranged in lanes 100 laterally offset from the lower-roller lanes 99.

Figures 10, 11:
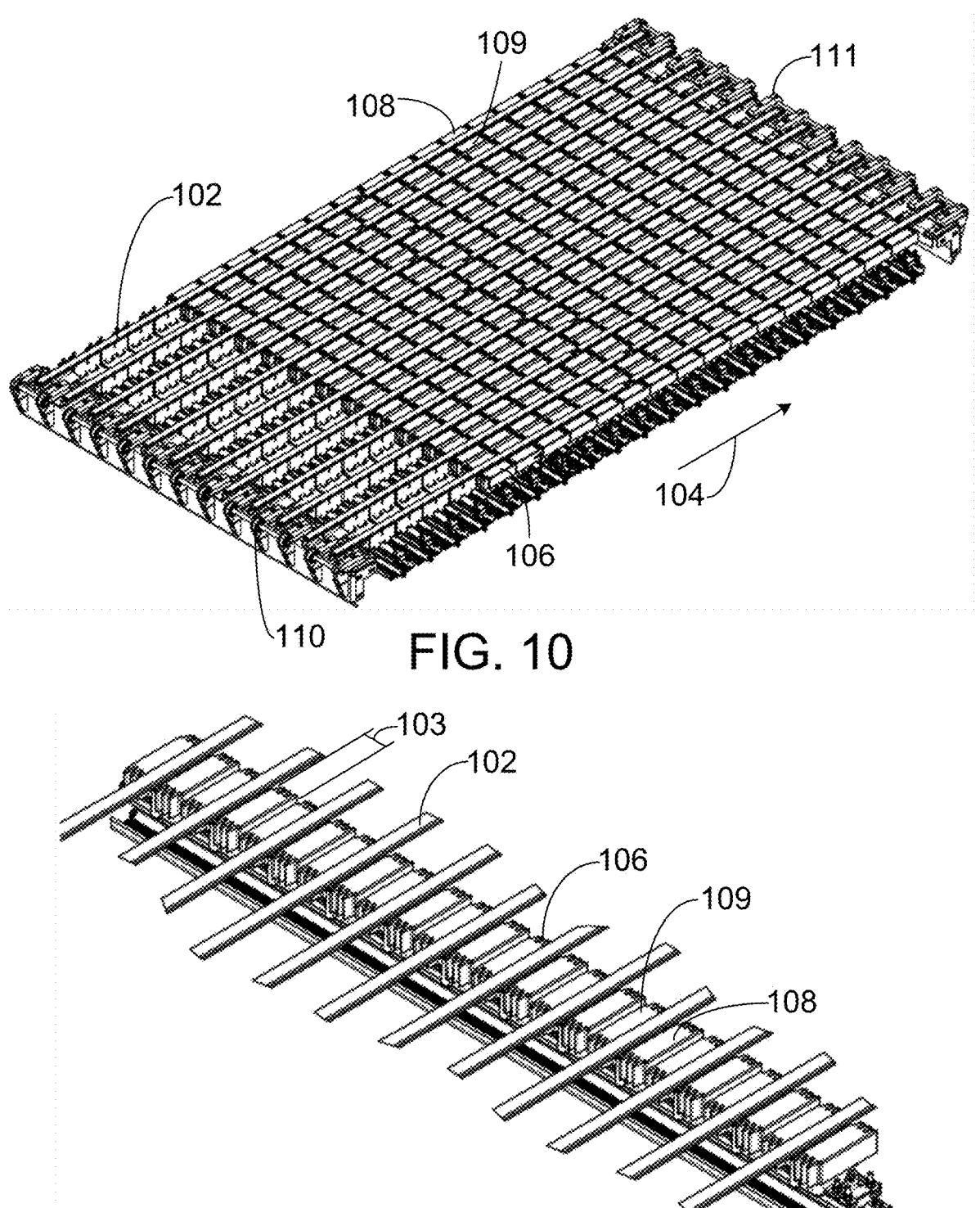
FIG. 10 is an isometric view of the carryway of a conveyor for a conveyor belt as in FIG. 8 showing roller actuation assemblies.
FIG. 11 is an enlarged isometric view of one row of roller actuation assemblies in the carryway of FIG. 10.

A carryway and roller-activation arrangement for the conveyor belt 92 of FIG. 8 is shown in FIG. 10. The carryway is characterized by laterally spaced linear wear-strips 102 that extend along the carryway parallel to the direction of belt travel 104. The wearstrips support the conveyor belt along its bottom side in lanes between the lower rollers. Roller actuation assemblies 106 arranged in a two-dimensional matrix each have a pair of upward-facing bearing faces 108, 109 flanking one of the wearstrips 102. One row of the matrix is shown enlarged in FIG. 11. The matrix arrangement forms roller-actuation lanes 103 that extend along the length of the carryway. The roller actuation lanes 103 coincide with associated lower-roller lanes 99 (FIG. 9) of the conveyor belt so that the lower rollers 30 (FIG. 9) can ride on the bearing faces 108, 109 when the roller actuation assemblies 106 are actuated. Each roller actuation assembly 106 defines an individually controlled roller actuation zone of the conveyor. A contiguous group of roller actuation assemblies 106 actuated together defines a larger roller actuation zone on the conveyor. FIG. 10 also shows that the carryway has small-diameter nose rollers 110, 111 at opposite ends for tight transfers onto and off the ends of the conveyor belt. The lanes 100 of the scalloped portions 66 of the conveyor belt 92 of FIG. 9 align with the nose rollers 110, 111. Other conveyor configurations are possible. For example, sprockets or nose bars at the ends of the carryway could be used with the conveyor belt 92.

Figures 12, 13, 14:
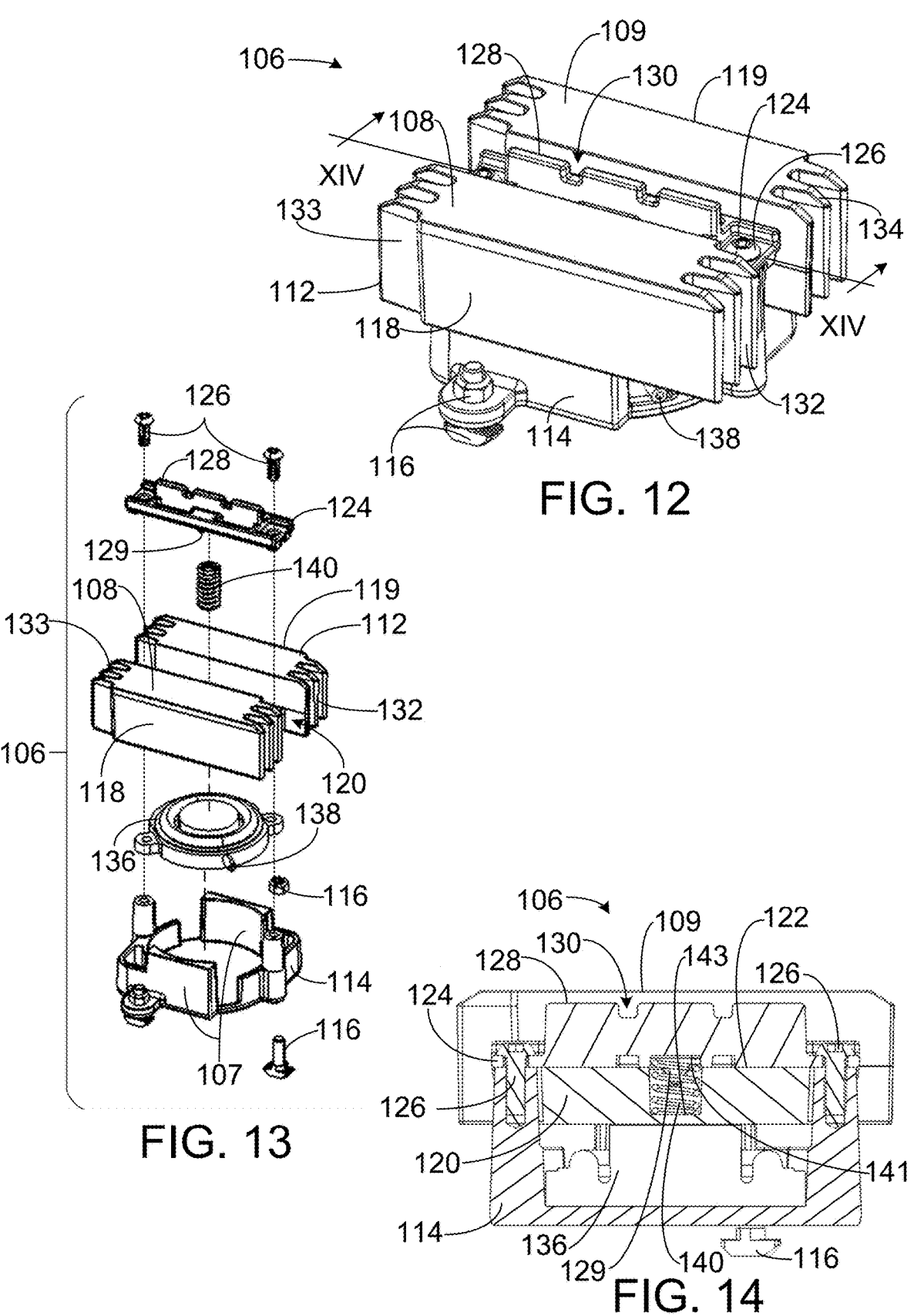
FIG. 12 is an isometric view of a roller actuation assembly as in FIG. 11.
FIG. 13 is an exploded view of the roller actuation assembly of FIG. 12.
FIG. 14 is a cross section taken along lines XIV-XIV of FIG. 12.

Further details of the roller actuation assemblies 106 are shown in FIGS. 12-14. Each assembly 106 includes a bearing unit 112 slidably attached to an actuator base 114. The base 114 is attachable to a conveyor frame (not shown) with fastening hardware 116. The bearing unit 112 has two bearing blocks 118, 119 that extend in length in the direction of belt travel 104 (FIG. 10). The bearing unit 112 can be solid, but for reduced weight, it can be largely honeycombed with stiffening walls bounding interior cells, or pockets. Guides 107 standing up from the actuator base 114 extend into two of the interior pockets of the bearing unit 112 in the lowered position to hold it in registration. The bearing faces 108, 109 form the tops of the bearing blocks 118, 119. The bearing unit 112 can be made of a material such as nylon or UHMW for extended wear life. An intermediate portion 120 of the bearing unit 112 is connected to the facing sides of the bearing blocks 118, 119. A top face 122 of the intermediate portion 120 lies below the top bearing faces 108, 109. A wearstrip support 124 is stationarily affixed to the actuator base 114 by screws 126. A fin 128 extends upward from the wearstrip support 124. A T-shaped wearstrip 102 (FIG. 11) with a split stem mounts on the fin 128 between the two bearing blocks 118, 119. V-shaped protrusions 129 extending down from the bottom of the wearstrip support 124 are received in mating V-shaped recesses opening onto the top face 122 of the intermediate portion 120 as the bearing unit 112 is being raised to guide it into registration. Notches 130 in the fin 128 admit bumpers (not shown) at one or the other position to define the ends of wearstrip segments. Each bearing block has vertical vanes 132, 133 at both ends. The vanes 132 at one end are laterally offset from the vanes 133 at the other end so that the vanes of adjacent roller actuation assemblies 106 can interleave as in FIG. 10. The interleaved vanes 132, 133 form an overlap of flat bearing surfaces when the bearing units 112 of adjacent roller actuation assemblies 106 are in the raised position. The overlapping interleaved vanes 132, 133 form a flat-surfaced bridge between adjacent raised bearing faces. Upper leading corners 134 of the vanes 132, 133 are beveled to prevent the conveyor belt from catching at the interface between adjacent roller actuation assemblies 106.

The bearing unit 112 is vertically movable relative to the stationary actuator base 114 and the wearstrip support 120 by means of an actuator 136 mounted in the actuator base. The actuator 136, which is shown as a pneumatically actuated bladder is coupled to the bottom of the bearing unit 112. When the bladder actuator 136 is inflated, as in FIG. 14, through its nipple 138 from a compressed-air source via valves (not shown), it stretches a spring 140 while pushing the bearing unit 112 upward into a raised position with its bearing faces 108, 109 in contact with the lower rollers of a conveyor belt supported on the carryway. When the bladder actuator 136 is deflated, the spring 140, which has an upper end seat 141 in the bottom of the stationary wearstrip support and a lower end seat 143 at the blind end of a recess in the intermediate portion 120, biases the bearing unit 112 downward to a lowered position, in which the bearing faces 108, 109 are lowered out of contact with the conveyor belt's lower rollers as the spring relaxes. Although the actuator 136 was described as a pneumatically actuated bladder, other actuators, such as hydraulic or electromagnetic, could be used to raise and lower the bearing unit 112.

Figures 15, 16:
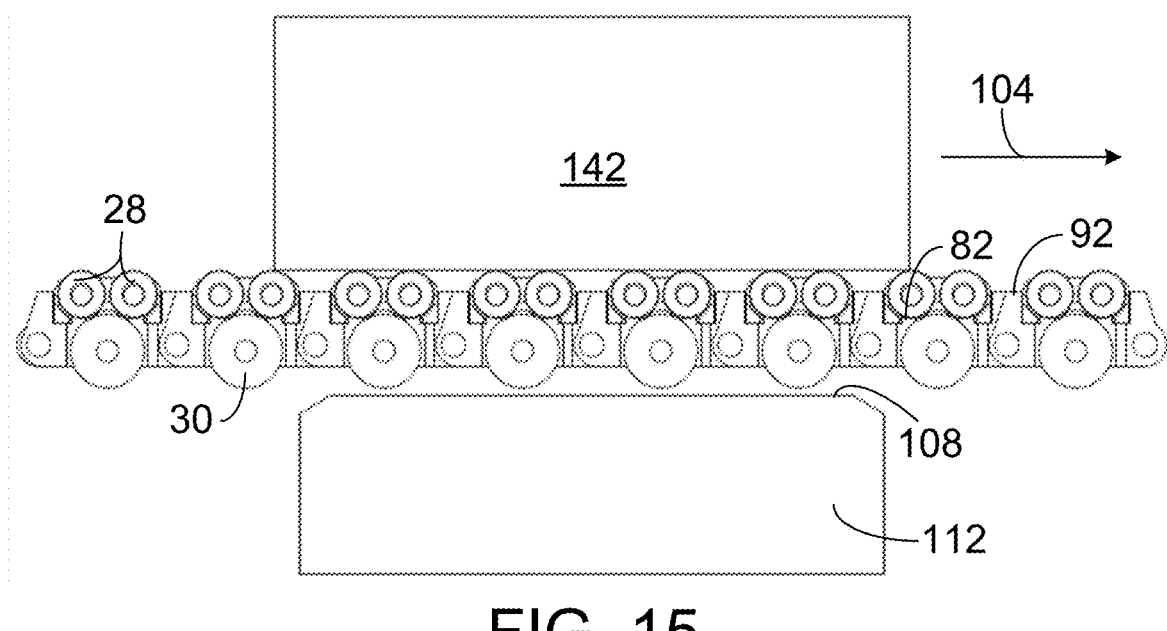
FIG. 15 is a cutaway side view of the conveyor belt of FIG. 8 with its upper rollers deactuated by a lowered bearing surface.
FIG. 16 is a cutaway side view as in FIG. 15, but with the rollers actuated by a raised bearing surface.

The operation of the conveyor belt 92 with the belt rollers 28, 30 deactuated and actuated is shown in FIGS. 15 and 16. In FIG. 15 the bearing unit 112 is shown in a lowered, deactuating position with its top bearing face 108 below the level of and out of contact with the bottoms of the lower rollers 30, whose axles rest on the slot seats 60 (FIG. 5). The weight of a conveyed article 142 sitting on the upper rollers 28 pushes the upper rollers downward against the braking pads 82. Because the upper rollers 28 are prevented from rotating, the article 142 does not move relative to the belt 92 and, so, rides in the direction of belt travel 104 with the belt 92.

When the bearing unit 112 is raised by the actuator to its raised, actuating position as in FIG. 16, the lower rollers 30 ride along the top bearing face 108 of the bearing unit 112. The level of the top bearing face 108 is slightly below the level of the top of the belt-supporting wearstrip. Alternatively, if the conveyor belt has recessed channels or scallops at the lower-roller positions, the top bearing face 108 would be raised to a level above the top of the wearstrip. The upward force of the bearing unit 112 pushes the lower rollers 30 upward along the slots 58 (FIG. 5) into contact with the upper rollers 28. As the conveyor belt 92 advances in the direction of belt travel 104, the lower rollers 30 rotate as shown, which causes the upper rollers 28 to rotate in the opposite direction as also shown. Because the tangential velocity of the upper rollers is opposite the direction of belt travel 104, the conveyed article 142 moves rearward relative to the conveyor belt 92 at the same velocity and, so, marks time in place on the conveyor. In that way articles can accumulate atop the conveyor belt 92 for even long periods with no backline pressure and no physical barrier blocking the conveying path. And articles can be crisply accelerated forward at the appropriate time by deactuating the actuator and allowing the spring and gravity to rapidly lower the bearing unit or units 112 under the articles.

As shown in FIG. 8, each upper roller 28 has a central portion 144 flanked by a pair of outer portions 146. The diameter of the central portion 144 is less than the diameter of the outer portions 146. The central portion 144 is the portion of the upper roller 28 that is contacted by the lower roller when the roller actuation assemblies are in their raised, actuated positions. If there is no slip between the lower roller and the central portions 144 of the upper rollers 28, the tangential velocities at the tops of the lower rollers and the central portions of the upper rollers are equal in magnitude to each other and to belt speed and opposite in direction. The tangential velocity of the larger-diameter outer portions 146 of the upper rollers 28 is greater than the tangential velocity of the smaller-diameter central portion. Because slip between the lower roller and the upper rollers 28 or the bearing faces is a common operating condition, the slightly greater diameter of the outer portions 146 and the concomitant increase in tangential velocity of the outer portions compensates for the slip-caused reduction in roller speed relative to belt speed. Without slip compensation, conveyed articles could creep forward along the carryway instead of marking time or migrating slowly and acceptably rearward. Forward creep in an actuated roller actuation zone is unacceptable because it could result in an article's advancing forward out of the actuated zone into a deactuated zone and improperly carried downstream by the conveyor belt. Rearward creep in an actuated zone, on the other hand, is acceptable because even if an article retreats rearward, once it reaches the upstream end of the actuated zone, the article is prevented from creeping farther rearward by the deactuated rollers passing through the adjacent upstream deactuated zone. If the upper and lower rollers have geared surfaces for positive engagement, the diameter of the geared central portion of the upper rollers does not have to be less than the diameter of the outer portions.

Figures 17, 18:
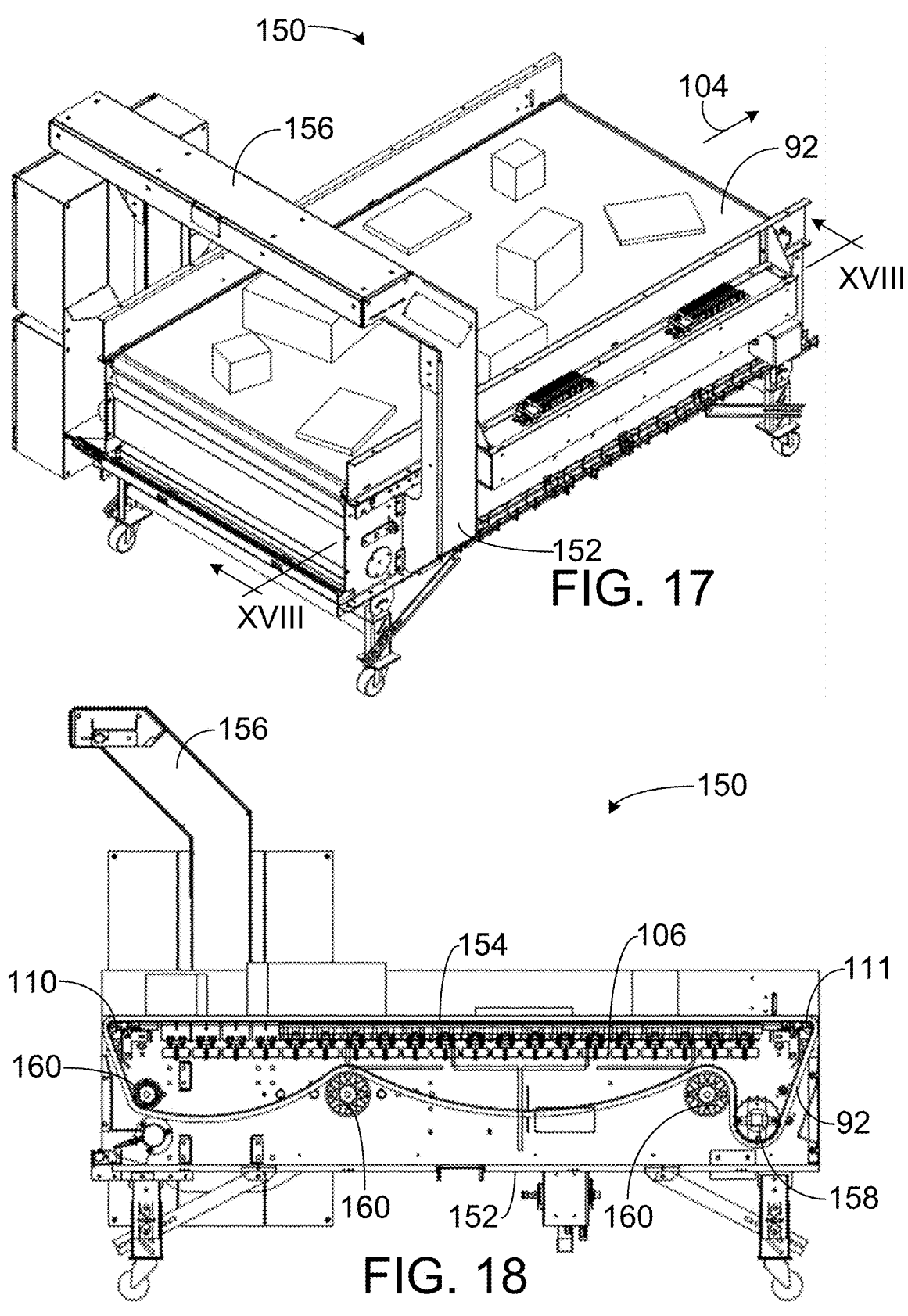
FIG. 17 is an isometric view of a conveyor using a conveyor belt as in FIG. 8 on a carryway as in FIG. 10.
FIG. 18 is a cross section taken along lines XVIII-XVIII of FIG. 17.

FIGS. 17 and 18 depict a conveyor 150 using the conveyor belt 92 of FIG. 8 and the roller actuation assemblies 106 of FIG. 10. The conveyor belt 92 is mounted in a conveyor frame 152. An upper carryway 154 is formed by the wearstrips 102 of FIG. 10. The roller actuation assemblies 106 in the carryway 154 lie under the belt 92 downstream of a package-detection system 156 that detects the outlines (lengths and widths) of the articles entering the conveyor 150. The conveyor belt 92 negotiates the nose rollers 110, 111 at the ends of the carryway 154. The conveyor belt 92 is driven by motor-driven drive sprockets 158 in the lower belt return just after the exit nose rollers 111. Idle return rollers 160 support and guide the belt 92 in the return.

The article-detection system 156, which may include a camera, a rangefinder, or an optical detector, determines the sizes and shapes of articles on the belt 92 so that the crowd of articles can be rearranged on the belt as required. For example, if side-by-side articles have to be separated, the roller actuation assemblies 106 under one of the side-by-side articles can be actuated to cause the article to mark time while the other article, atop braked, deactuated rollers, is allowed to proceed along the carryway 154 in the direction of belt travel 104. Similarly, gaps can be interposed between consecutive articles.

Figure 19:
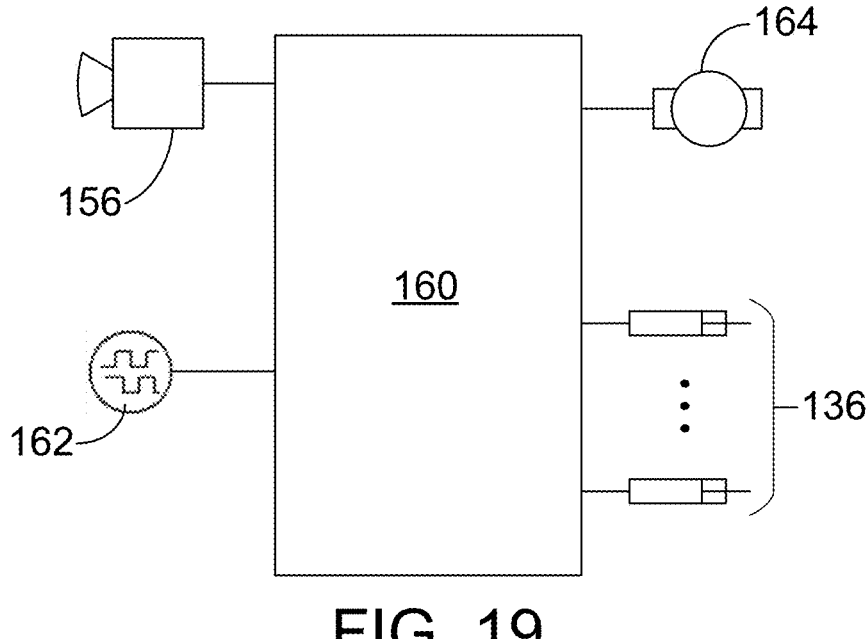
FIG. 19 is a block diagram of a control system for the conveyor of FIG. 17.

A block diagram of a control system usable with the conveyor of FIGS. 17 and 18 is shown in FIG. 19. A processor 160, such as a programmable controller or other programmable processing device, receives information from the article-detection system 156 from which the processor determines each article's size, shape, and position. Together with belt speed information from a shaft encoder 162 mounted on the drive shaft, for example, the processor 160 executes program instructions stored in a program memory to determine an article's position on the belt and its relation to the roller actuation assemblies under the article at any time. Knowing the article's position, the processor 160 executes further instructions to individually selectively actuate or deactuate each of the actuators 136 in the roller actuation assemblies in each roller actuation zone to correspondingly actuate or deactuate the belt rollers passing through that zone. The processor can also adjust the speed of the conveyor belt by controlling its motor drive 164.

The terms "top," "bottom," "upward," "downward," "upper," and "lower" refer to orientations of the conveyor belt and the roller actuation assemblies on a horizontal carryway and are not used in an absolute limiting sense, but in a relative sense as an aid in description.

What is claimed is:

1. A conveyor belt comprising:
a bottom side;
a plurality of cradles, each supporting at least one roller set that includes:
    a lower roller having a salient portion that protrudes below the bottom side;
    a pair of upper rollers forming a support surface for conveyed articles;
    wherein the diameter of the lower roller is greater than the diameter of the upper rollers;
    wherein the lower roller and the upper rollers are rotatable on axes perpendicular to a direction of belt travel;
    wherein rotation of the lower roller in one direction causes the upper rollers to rotate in the opposite direction when the lower roller is in contact with the upper rollers;
wherein each of the cradles is translatable from a first position in which the upper rollers are at a first height level to a second position in which the upper rollers are at a higher second height level and in contact with the lower rollers.

2. The conveyor belt as claimed in claim 1 wherein the upper rollers are axially longer than the lower roller.

3. The conveyor belt as claimed in claim 1 wherein the upper rollers each have a central portion between two outer portions and wherein the diameter of the central portion is less than the diameter of the outer portions and wherein the lower roller contacts the central portion.

4. The conveyor belt as claimed in claim 1 comprising axles defining the axes of rotation about which the upper rollers rotate and wherein the cradles include end supports retaining the ends of the axles.

5. The conveyor belt as claimed in claim 1 wherein the cradles each include two of the roller sets axially spaced from each other.

6. The conveyor belt as claimed in claim 1 wherein the cradle has a pair of legs suspended from the cradle down to distal ends with slots formed in the legs extending to slot bottoms upward of the distal ends and wherein the lower roller has an axle defining the lower roller's axis of rotation and whose ends are received in the slots on opposite sides of the lower roller.

7. The conveyor belt as claimed in claim 6 comprising tabs at the distal ends of the legs and retention structure in the conveyor belt that engages the tabs to retain the cradles in the conveyor belt.

8. The conveyor belt as claimed in claim 1 wherein the pair of upper rollers translate with the cradle and wherein the lower roller can translate with or relative to the cradle.

9. The conveyor belt as claimed in claim 1 comprising braking surfaces extending into the cradles into contact with the upper rollers when the cradle is in the first position to inhibit rotation of the upper rollers.

10. The conveyor belt as claimed in claim 9 comprising a series of rows of one or more belt modules having spaced apart hinge elements at opposite ends linked together by hinge rods extending through the interleaved hinge elements of adjacent rows, wherein the braking surfaces are formed in and the cradles are supported in individual ones of the belt modules.

11. The conveyor belt as claimed in claim 1 wherein the bottom side is scalloped in spaced apart lanes extending in the direction of belt travel.

12. A conveyor belt module comprising:
a base and a roller assembly slidably attached to the base;
wherein the base extends in a length direction from a first end to a second end and laterally in a width direction from a first side to a second side and includes:
    a bottom side and an upper deck;
    a first set of hinge elements spaced apart along the first end and a second set of hinge elements spaced apart along the second end;
    a cavity opening onto the bottom side and the upper deck;
    bosses on the upper deck;
wherein the roller assembly includes:
    a cradle having at least one pair of side-by-side roller beds and end supports at opposite ends of the roller beds;
    upper rollers in the roller beds;
    a lower roller disposed in the cavity and having a salient portion extending below the bottom side and having a lower-roller axle and;
    upper-roller axles supported by the end supports and extending laterally through the upper rollers and defining a lateral axis of rotation for the upper rollers;
    wherein the cradle further includes openings in the roller beds for the bosses;
wherein raising the lower roller pushes against the upper rollers to raise the cradle away from the upper deck so that the bosses do not extend through the openings into the roller beds and so that rotation of the lower roller in one direction causes the upper rollers to rotate in the opposite direction, and wherein lowering the lower roller allows the cradle to rest against the upper deck with the bosses extending through the openings into the roller beds and against the upper rollers to brake the upper rollers from rotating.

13. The conveyor belt module as claimed in claim 12 wherein the base includes stops protruding from laterally opposite sides of the cavity at a position between the bottom side and the upper deck and forms channels extending from the bottom side to the stops and wherein the cradle includes:

a pair of legs extending downward from the cradle through the cavity toward the bottom side and flanking the lower roller, each leg having:

a distal end and a slot extending downward from the roller beds to a slot seat short of the distal end, wherein the ends of the lower-roller axle reside in the slots on laterally opposite sides of the cavity providing the lower roller with a lateral axis of rotation;

tabs extending laterally away from the lower roller at the distal ends of the legs and engageable by the stops to confine the cradle to the base;

wherein the legs are long enough so that the tabs have a range of motion along the channels from the stops to the bottom side.

14. The conveyor belt module as claimed in claim 12 comprising wall segments extending upward from the hinge elements to form laterally extending segmented walls at the first and second ends of the base to confine the roller assembly in the length direction.

15. The conveyor belt module as claimed in claim 12 wherein the diameter of the lower roller is greater than the diameter of the upper rollers.

16. The conveyor belt module as claimed in claim 12 wherein the axial length of the lower roller in the width direction is less than the axial length of the upper rollers in the width direction.

17. The conveyor belt module as claimed in claim 12 wherein the upper rollers each have a central portion flanked by outer portions and wherein the diameter of the outer portions is greater than the diameter of the central portion.

18. The conveyor belt module as claimed in claim 17 wherein the lower roller contacts the central portion of the upper rollers.

19. The conveyor belt module as claimed in claim 12 comprising two lower rollers and wherein the base has two laterally spaced stops, bosses, and cavities for the two lower rollers and wherein the roller assembly includes two laterally spaced cradles.

20. A roller actuation assembly comprising:

an actuator base;

a bearing unit slidably attached to the actuator base and including:

a pair of bearing blocks having top bearing faces extending in length in a first direction from a first end to a second end;

an intermediate portion connected to the pair of bearing blocks and having a top face below the level of the top bearing faces;

an actuator mounted in the actuator base and coupled to the bearing unit to move the bearing unit between a lowered position and a raised position.

21. The roller actuation assembly as claimed in claim 20 wherein the actuator is a pneumatic actuator disposed between the actuator base and the bearing unit.

22. The roller actuation assembly as claimed in claim 20 comprising a wearstrip support stationarily affixed to the actuator base above the top face of the intermediate portion of the bearing unit.

23. The roller actuation assembly as claimed in claim 22 comprising a spring extending from the wearstrip support to the top face of the intermediate portion of the bearing unit to bias the bearing unit downward toward the lowered position.

24. The roller actuation assembly as claimed in claim 20 wherein the bearing blocks have vanes extending from the first and second ends in the first direction, wherein the vanes extending from the first ends are offset from the vanes extending from the second ends so that the vanes can interleave with the vanes of an adjacent roller actuation assembly.

25. A conveyor comprising:

a conveyor belt including:

a bottom side;

multiple roller assemblies arranged in lanes extending in a direction of belt travel, wherein each of the roller assemblies includes:

a lower roller having a salient portion that protrudes below the bottom side;

a pair of upper rollers forming a support surface for conveyed articles;

wherein the lower roller and the upper rollers are rotatable on axes perpendicular to a direction of belt travel;

wherein rotation of the lower roller in one direction causes the upper rollers to rotate in the opposite direction when the lower roller is in contact with the upper rollers;

a cradle supporting the pair of upper rollers;

wherein the cradle and the lower roller are vertically translatable;

a plurality of roller actuation assemblies disposed below the conveyor belt, each of the roller actuation assemblies associated with one or more of the lanes of roller assemblies and including:

one or more bearing faces extending in length in the direction of belt travel under the lower rollers in one or more of the lanes of roller assemblies;

a wearstrip support positioned below the bottom side of the conveyor between the lower rollers of consecutive lanes;

an actuator that moves the one or more bearing faces from a lowered position out of contact with the lower rollers in the associated lanes to a raised position providing surfaces on which the lower rollers in the associated lanes can rotate in one direction as the conveyor belt advances in the direction of belt travel to cause the upper rollers to rotate in the opposite direction;

wearstrips supported on the wearstrip supports to contact the bottom side of the conveyor belt between the lower rollers of consecutive lanes.

26. A conveyor as claimed in claim 25 wherein the plurality of roller actuation assemblies are independently actuated and arranged in a two-dimensional matrix of columns corresponding to the lanes and rows extending across a width of the conveyor.

27. A conveyor as claimed in claim 25 comprising an article-detection system and a processor receiving article size and position information from the article-detection system and executing program instructions to determine the articles' positions on the conveyor belt and their relation to the roller actuation assemblies under the articles and to selectively actuate or deactuate the roller actuation assemblies.

28. A conveyor as claimed in claim 25 wherein each of the roller actuation assemblies includes two bearing faces, each associated with a separate lane of the roller assemblies.

29. The conveyor as claimed in claim 25 wherein the roller actuation assemblies have vanes extending in length in the direction of belt travel from opposite ends of the bearing faces, wherein the vanes extending from one end are offset from the vanes extending from the second end so that the vanes can interleave with the vanes of an adjacent roller actuation assembly.

30. A conveyor belt comprising:

a bottom side;

a plurality of cavities opening onto the bottom side;

a lower roller mounted in each of the cavities with a salient portion protruding below the bottom side and wherein the lower roller is translatable along the cavity;

a plurality of cradles, each supporting two or more roller sets that each include:

a pair of upper rollers forming a support surface for conveyed articles;

wherein the lower rollers and the upper rollers are rotatable on laterally extending axes perpendicular to a direction of belt travel;

wherein the two or more roller sets are laterally spaced across the width of the conveyor belt;

wherein each of the roller sets is associated with one of the lower rollers;

wherein rotation of the lower rollers in one direction causes the upper rollers in the associated roller sets to rotate in the opposite direction when the lower rollers are in contact with the upper rollers;

wherein each of the cradles is translatable from a first position in which the upper rollers are at a first height level to a second position in which the upper rollers are at a higher second height level and in contact with the lower rollers.

31. A conveyor belt as claimed in claim 30 comprising axles on which the lower rollers are mounted for rotation and wherein ends of the axles are supported in the cradles free to translate relative to the cradles.

32. A conveyor belt comprising:

a bottom side;

a plurality of cavities opening onto the bottom side;

a plurality of cradles, each supporting one or more roller sets that each include:

one or more upper rollers forming a support surface for conveyed articles;

a lower roller with a salient portion protruding below the bottom side from one of the cavities and wherein the lower roller is translatable along the cavity;

a lower-roller axle on which the lower roller is mounted for rotation and wherein ends of the lower-roller axle are received in the cradle free to translate relative to the cradle;

wherein the lower rollers and the one or more upper rollers are rotatable on laterally extending axes perpendicular to a direction of belt travel;

wherein rotation of the lower rollers in one direction causes the upper rollers to rotate in the opposite direction when the lower rollers are in contact with the upper rollers;

wherein each of the cradles is translatable from a first position in which the upper rollers are at a first height level to a second position in which the upper rollers are at a higher second height level and in contact with the lower rollers.

33. A conveyor belt as claimed in claim 32 wherein the cradles have pairs of legs that extend into the cavities and that form facing vertical slots that receive the ends of the lower-roller axles.

\* \* \* \* \*